July 21, 1942.  J. J. WYDLER  2,290,265
DISPLACEMENT COMPRESSION AND ENGINE SUPERCHARGING
Filed Oct. 16, 1940   3 Sheets-Sheet 1
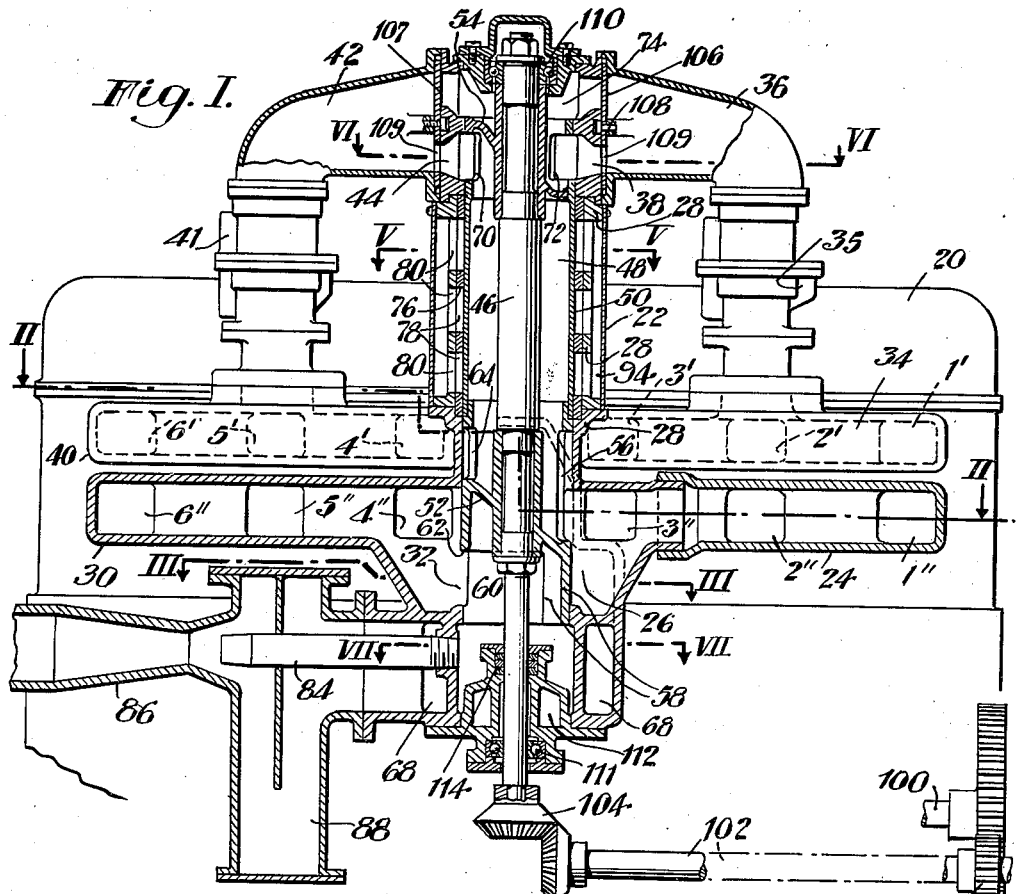
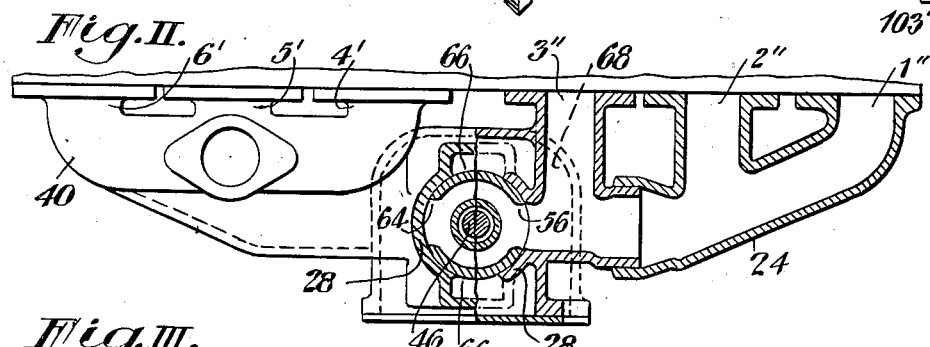
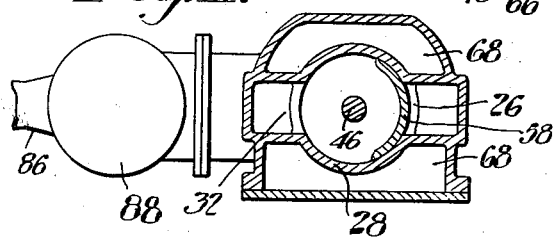
INVENTOR
JOHANN J. WYDLER
BY
ATTORNEY

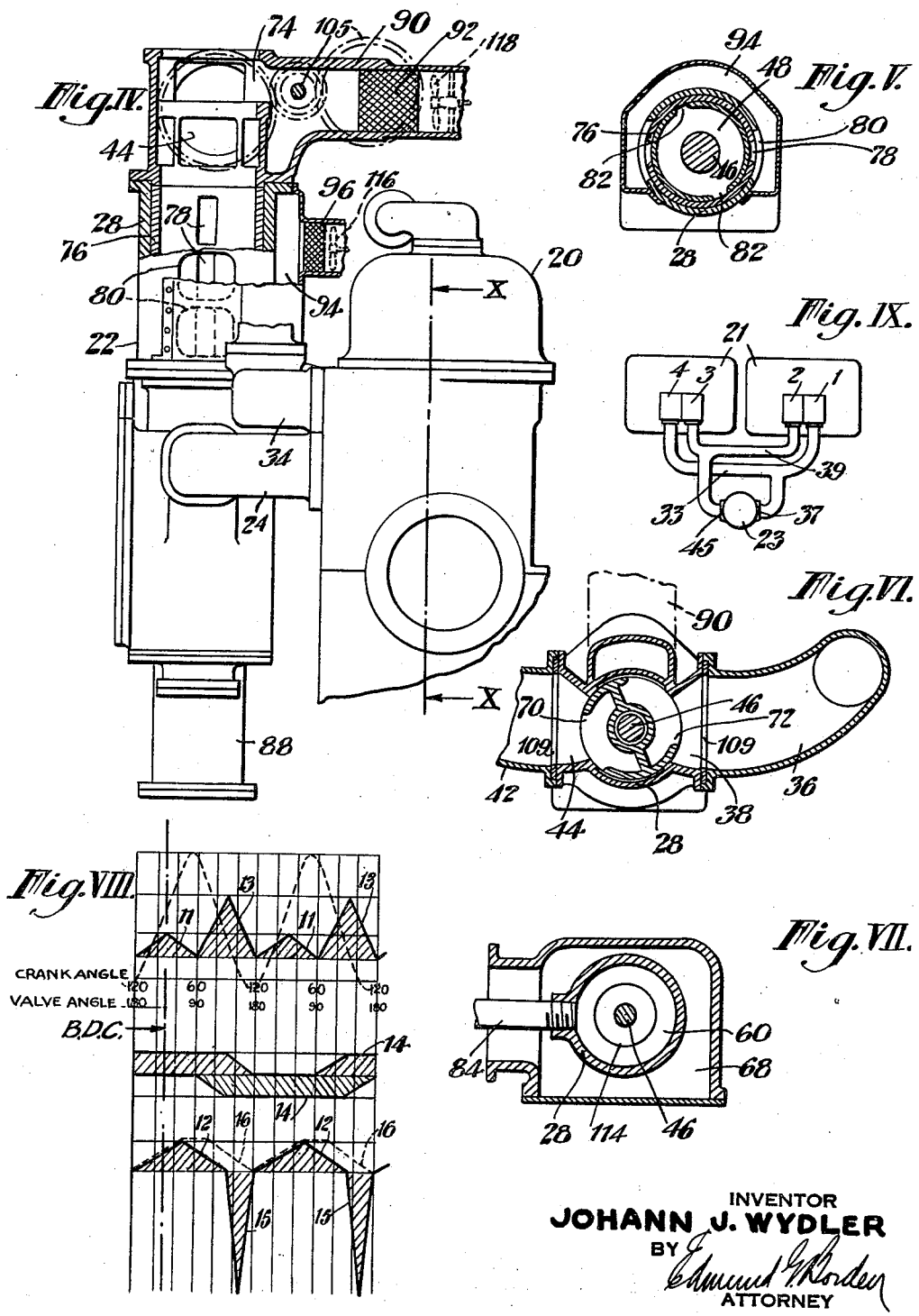

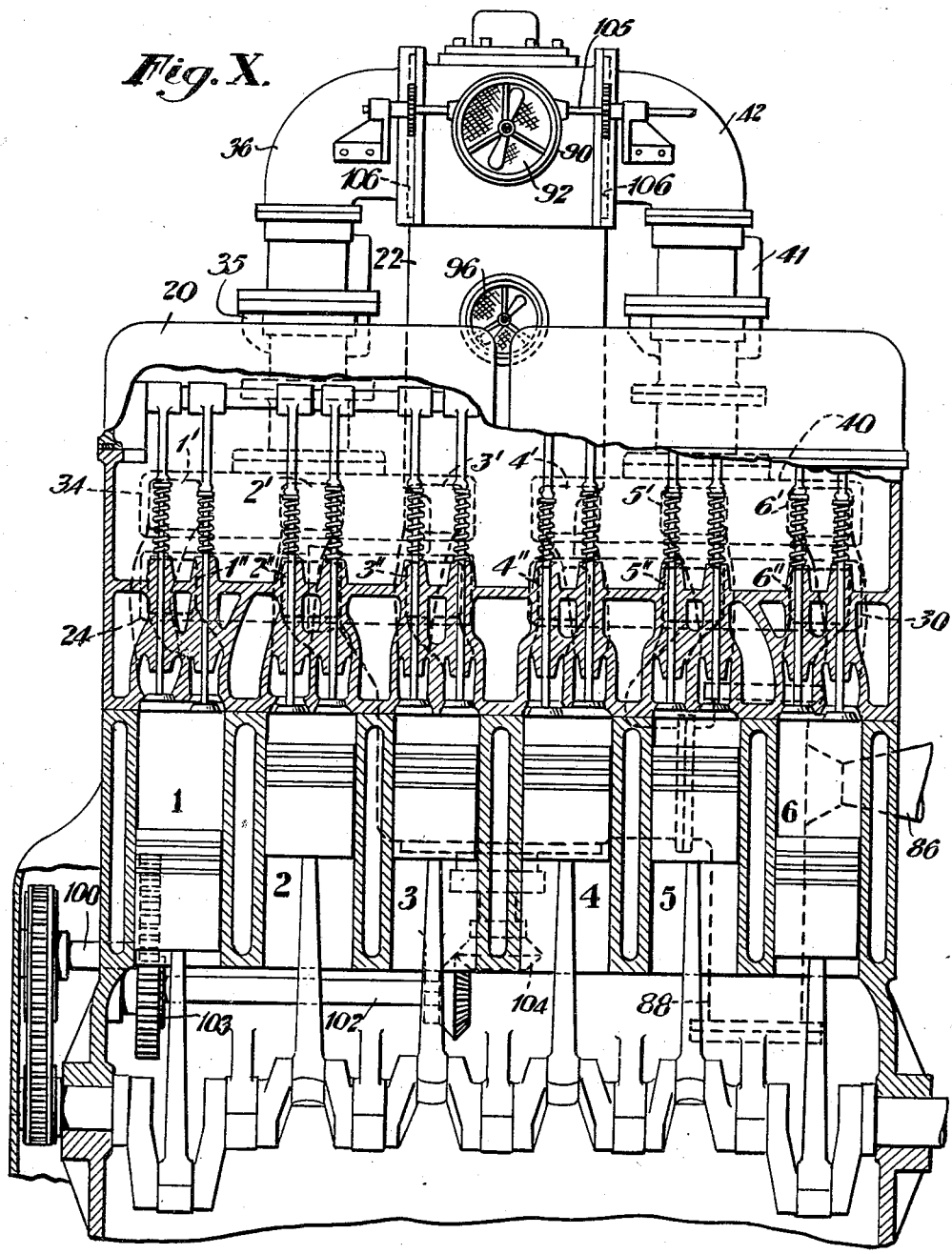

Patented July 21, 1942

2,290,265

UNITED STATES PATENT OFFICE 2,290,265

DISPLACEMENT COMPRESSION AND
ENGINE SUPERCHARGING

Johann J. Wydler, Westfield, N. J., assignor, by mesne assignments, to Cities Service Oil Company, New York, N. Y., a corporation of Pennsylvania Application October 16, 1940, Serial No. 361,351

20 Claims. (Cl. 123—52)

This invention relates to the displacement compression and pumping of gases, and more particularly to improved energy conversion method and apparatus designed to utilize energy derived from the exhaust gases of internal combustion engines for compressing air for supercharging the engine.

The gas exhaust period of the cycle of any four cycle internal combustion engine cylinder may be divided into two distinct phases. During the first phase of the exhaust period, just after the exhaust valve has been opened, a substantial proportion (roughly 50%) of the total weight of gas in the cylinder is rapidly discharged as a high pressure "puff" wave moving outwardly from the cylinder into the exhaust manifold at high initial pressure and at high velocity. During the second phase of the exhaust period the remaining portion of the exhaust gases leaves the cylinder under a relatively low pressure head and at moderate velocity in front of the advancing piston; this period of the cycle being referred to as the "stroke" period of the exhaust.

Stroboscopic pressure measurements which have been made in the exhaust manifold of a six cylinder four stroke cycle internal combustion engine operating at 1200 R. P. M. clearly demonstrate that during one full engine cycle of two revolutions, six distinct and substantially harmonic pressure waves are produced inside the manifold; the peaks of such waves being spaced at equal time intervals, corresponding to the equally spaced puff exhaust periods of the six exhausting cylinders. Thus each individual cylinder puff exhaust wave has a total length equivalent to 120° crank angle of the engine. While the stroke exhaust of one cylinder is flowing through the exhaust manifold the puff exhaust of another cylinder is superimposed onto the first stroke exhaust. However, the stroke exhausts do not change the essential wave character of the puff exhausts, though they do lift the average back pressure level of the puff exhaust waves up to a pressure of about 3" of mercury. Despite this rather strong average back pressure obtaining in the exhaust manifold, the pressure measurements indicate that there is a short period of subatmospheric pressure (amounting to about 2" of mercury) developed in the manifold between successive pressure waves. One object of the present invention is to prolong and intensify this period of partial vacuum by lowering the average back pressure within the manifold from say 3" of mercury down to 1" of mercury.

The present invention is a continuation-in-part of and an improvement on that described in my copending application Serial No. 277,162, filed June 3, 1939, U. S. Patent No. 2,264,126, granted November 25, 1941. According to the invention of the aforesaid copending application, a gas displacement air compressor is employed as the means for compressing air for supercharging one cylinder of a multicylinder four cycle internal combustion engine by means of the pressure energy of the coinciding puff discharge wave of exhaust gases leaving another cylinder of the engine which is operating 360° apart in crank angle phase with respect to the first cylinder. The displacement compressor operates as a gas piston pump or compressor, in which a body of air first introduced into the pump chamber is compressed and then discharged by a nonturbulent stratified layer or wave of hot exhaust gases under pressure moving forward in direct contact with and displacing the air in the pump chamber, without substantial mixing with or contamination of the air by the gas. According to the aforementioned copending application, the invention therein described involves the use with a multicylinder engine of sufficient number of exhaust manifolds and displacement air compressors to insure that the exhaust cycles in any exhaust manifold connected to a compressor should not interfere with or overlap each other, or in other words should not follow each other at intervals shorter than 180° crank angle. Thus, in the case of a six cylinder four cycle engine, at least two displacement compressors were respectively connected with an engine having two intake manifolds and two exhaust manifolds in such a way that the puff exhaust waves developed in one manifold by one group of engine cylinders could be utilized in one compressor for compressing air for supercharging the other group of cylinders.

The primary object of the present invention is to provide improved gas displacement method and apparatus which is adapted to utilize the energy supplied by the exhaust puff waves of a multicylinder engine following each other at intervals shorter than 180° crank angle, for compressing air within a single compression chamber. The present invention features an improved design of gas displacement compressor adapted to utilize within a single pump space the ramming effects of the successive puff discharges of at least four (for example six) cylinders of a multicylinder four cycle engine for compressing air and discharging it from the pump space; and to provide such a pump operable to complete its cycle, including sufficient time for scavenging with fresh air at the end of the cycle, within a period of less than 180° (for example 120°) crank angle of the engine with which the pump is operatively connected.

According to the disclosure of my aforementioned copending application, the air compression and displacement period in the operating cycle of each displacement compressor is followed by a scavenging period during which the exhaust gases are discharged from the compressor and the compressor is scavenged with atmospheric air. A major part of the energy for such scavenging operation is derived from the exhaust gases which are discharged from the exhausting engine cylinder during the stroke part of the cylinder exhaust cycle, utilizing a gas aspirator operated by the stroke exhaust for developing the necessary partial vacuum to assist in the scavenging operation. Based on the pressure wave measurements heretofore referred to, the the piping system leading from the displacement compressor of the present invention has been redesigned with the idea of developing a rapid drop of the exhaust wave from its pressure peak during the reexpansion period within the pump for the purpose of building up a more intensive partial vacuum within the pump space and extending the period of such partial vacuum to insure proper scavenging. A principal feature of the new design involves the addition of a generous expansion space outside the gas exhaust ports of the compressor to keep the reactive back pressure down as much as possible; and the provision of gas transfer passages and an ejector nozzle associated with such expansion space in such a way that the successive stroke exhausts from all engine cylinders are directed through the ejector nozzle thus provided to develop continuous suction effect on the expansion space to thereby develop an average subatmospheric pressure in the expansion space throughout the complete operating cycle for the engine and compressor.

With the above and other objects and features in view, the invention consists in the improved apparatus for compressing air and for supercharging a multicylinder four cycle internal combustion engine which is hereinafter described and more particularly defined by the accompanying claims.

In the following description of the invention, reference will be made to the accompanying drawings, in which:

Fig. I is a view in vertical section, with parts in elevation, showing a six cylinder four cycle internal combustion engine-air compressor assembly, in accordance with the present invention.

Fig. II is a cross-sectional view of the exhaust gas inlet end of the compressor, taken on the plane II—II of Fig. I.

Fig. III is a cross-sectional view of the stroke exhaust bypass end of the compressor, taken on the line III—III of Fig. I.

Fig. IV is a view in end elevation of the engine-compressor assembly of Fig. I, with the top of the compressor shown in vertical section, and with the valve removed from the compressor.

Fig. V is a horizontal sectional view of the scavenging air intake portion of the compressor, taken on the line V—V of Fig. I.

Fig. VI is a horizontal sectional view of the compressed air discharge end of the compressor, taken on the line VI—VI of Fig. I.

Fig. VII is a cross-sectional view of the gas discharge end of the compressor taken on the line VII—VII of Fig. I.

Fig. VIII presents scale charts illustrating the areas and timing of port openings of a displacement compressor connected to a six cylinder engine operating with supercharging, and Fig. IX is a top plan view of an assembly of air compressor and four cylinder engine illustrating diagrammatically a preferred arrangement of manifold connections.

Fig. X is a view in longitudinal section through the cylinders of the engine of Fig. I, taken on the section X—X of Fig. IV, showing the pistons, valves, and cranks in position for supercharging one cylinder by energy derived from exhaust gases discharged from another cylinder; the displacement compressor, manifolds and connections being outlined in dotted lines.

In the engine-compressor assembly which is illustrated in Figs. I—VII and X, a six cylinder four stroke cycle internal combustion engine 20 is shown as operatively connected with a gas displacement air compressor 22 in such a way as to compress air by means of energy derived from the engine exhaust gases and to utilize the air thus compressed for supercharging the engine. It will be understood that the invention is not limited to the use of the compressed air for engine supercharging, nor is the invention limited in application to an engine having six cylinders. When the compressed air is used for supercharging the engine which furnishes the exhaust gas employed in the displacement compressor, the volume of exhaust gases produced by the engine is proportionately increased and thereby more energy is made available for operating the compressor. Of course this energy build-up takes place gradually over several initial cycles of the supercharger until a pressure balance is secured. This self-boosting is an advantage of employing the gas displacement compressor of the present invention as a supercharger which is not realizable with mechanically driven blower superchargers.

In the drawings, numerals 1, 2, 3, 4, 5 and 6 designate the engine cylinders, and numerals 1", 2", 3", 4", 5" and 6" designate exhaust ports of correspondingly numbered engine cylinders. Ports 1", 2" and 3" have been shown in Figs. I—IV as communicably connected through an exhaust manifold 24 to an exhaust gas transfer wall port 26 located near one end of a tubular housing 28 for the compressor 22. Ports 4", 5" and 6" have been likewise shown as connected through an exhaust manifold 30 to a hot gas transfer wall port 32 located near the same end of housing 28. Ports 26 and 32 are preferably identical in shape and area and are preferably located at opposite sides of the exhaust gas inlet end of the compressor 22. The intake ports 1', 2' and 3' of correspondingly numbered engine cylinders have been shown in Figs. I, IV and VI as connected through an intake manifold 34, a carbureter 35 and an air horn 36 to an air transfer port 38 located at the opposite end of compressor housing 28; while the intake ports 4', 5' and 6' have been shown as connected through an intake manifold 40, a carbureter 41 and an air horn 42 to an air transfer port 44, likewise located at the air discharge end of the compressor housing 28. Air transfer ports 38 and 44 are likewise preferably of identical shape and area and located at opposite sides of the air discharge end of the compressor.

The cylinders of the six cylinder engine illustrated have the firing order 1—5—3—6—2—4. During the period when cylinder 1 is starting its gas exhaust, cylinder 6 is finishing its air intake. Likewise while cylinder 5 is starting its gas exhaust, cylinder 2 is finishing its air intake. Likewise while cylinder 3 is starting its gas exhaust, cylinder 4 is finishing its air intake. Similarly when cylinders 6, 2 and 4 are successively starting their gas exhausts, cylinders 1, 5 and 3 are respectively and successively finishing their air intakes. Consequently when a six cylinder engine having the firing order indicated is operatively connected with a displacement air compressor to allow of use of the compressor for supercharging the engine, the cylinders of the engine must be paired in practicing the supercharging operation in such a way that the energy carried by the exhaust gas discharged from one cylinder of a pair can be utilized for compressing the air introduced into the other paired cylinder at the end of its intake period. During the first part of the air intake period for each engine cylinder, air may be supplied thereto directly from atmosphere. The pistons in each pair of cylinders as for example 5 and 2, pass simultaneously through their top and bottom dead center positions. However, the power strokes of the pistons of paired cylinders are 360° crank angle apart in phase.

The tubular housing 28 of the displacement compressor 22 preferably has a length considerably greater than its maximum internal diameter. In the drawings a valve drive shaft 46 is shown as mounted longitudinally within the compressor housing and extending from end to end thereof along the main axis of the compressor. The displacement compression chamber 48 of the compressor is of annular cross section and lies between the inner wall of a tubular valve 50 which is rotatably journaled in the compressor housing, and the outer circumference of the shaft 46. The chamber 48 need have a cubic capacity only sufficient to handle the volume of hot exhaust gases which is discharged from a single engine cylinder during the first or puff portion of its exhaust, and to compress the air with which a cylinder is supercharged at the end of its air intake period. Valve 50 is connected to shaft 46 at each end of the compressor by imperforate hub webs 52 and 54. Webs 52 and 54 form the end walls of the displacement compression chamber 48. The supporting hubs of valve 50 are keyed to shaft 46 for rotation therewith.

The hub webs 52 and 54 which form the end walls of compression chamber 48 do not extend perpendicularly from the hubs and cylindrical walls of the valve 50, but are mounted obliquely thereto. With the valve 50 in the position illustrated, the exhaust gas inlet end of the compressor is communicably connected to manifold 24 through the upper half of gas transfer port 26 by means of a port 56 in the wall of valve 50 adjacent the lower end of web 52. The lower half of port 26 is blanked off from communication with that portion 60 of the interior of housing 28 which lies below the valve web 52 by a semicylindrical extension 58 of valve 50 (Figs. I and III). Manifold 30 is shown at this period as communicably connected with the gas bypass chamber 60 at the lower end of housing 28 through the lower half of transfer port 32. The upper half of port 32 is shown as blanked off by semicylindrical extension 62 of valve 50. A port 64 is preferably cut in the wall of chamber 48 at a point diametrically opposite port 56. On substantially 90° clockwise rotation of the valve 50 with respect to the position illustrated, ports 56 and 64 will be brought into register with another pair of oppositely positioned gas discharge ports 66—66 in the walls of housing 28 through which gas may be discharged from the compressor into a gas expansion chamber 68 surrounding the lower end of housing 28.

With the valve 50 in the position illustrated, the pressure air discharge end of the compressor is communicably connected with intake horn 42 through housing port 44 by means of a port 70 in the end wall of compression chamber 48 lying immediately below the upper end of the valve web 54. Web 54 serves as a partition cutting off communication between chamber 48 and intake horn 36 with the valve in the position indicated, although a port 72 in the end wall of valve 50 opposite port 70 provides a communicating passage from a chamber 74, open to the atmosphere, through port 72 and housing port 38 into the air horn 36 at the air transfer end of housing 28.

Both end portions of valve 50 are dimensioned for rotation with a fairly tight journal fit within those sections of the cylindrical housing aligned therewith. However, that portion of the housing within which is disposed the middle section of the valve has an inside diameter which is sufficiently greater than the outside diameter of the valve to accommodate a cylindrical sleeve bushing 76 which journals the valve. At opposite sides of the bushing throughout a major part of its length apertures 78 are cut which are normally disposed in register with larger air inlet apertures or ports 80 in opposite wall portions of the housing. Narrow air inlet slots 82 are likewise formed in opposite side walls of that portion of valve 50 which rotates within the thus apertured bushing (Fig. V); such air inlet slots being so located as to register with the housing air intake ports at the same time that valve ports 56 and 64 are in register with housing gas exhaust ports 66.

Chamber 60 at the hot gas transfer end of the supercharger housing is in permanent communication with the atmosphere through an aspirator pressure discharge nozzle 84 and a venturi expansion funnel 86. Also gas expansion chamber 68 surrounding the exhaust gas transfer end of the compressor housing is in permanent communication with the atmosphere through a second expansion chamber 88 and the funnel 86. Gas transfer chamber 60 is connected alternately with one or the other of the two exhaust manifolds 24 and 30, but communication between chamber 60 and one manifold must be interrupted by valve extension 58 during the period when such manifold is communicably connected to compressor chamber 48. Expansion chamber 68 is periodically placed in communication with compression chamber 48 when valve ports 56 and 64 register with gas discharge ports 66 in the housing.

Chamber 74 at the opposite end of the housing serves as an air supply chamber which connects one or the other of the two intake horns 36 and 42 through one or the other of the two air ports 38 or 44 in the housing and by way of the valve port 72, with an air supply conduit 90 from which air at atmospheric pressure or at a pressure slightly above atmospheric pressure is supplied through a filter 92. In the drawings (Figs. I, IV and V) the middle section of the compressor is shown as enclosed by an air supply duct 94 to which air is delivered by a conduit 96 incorporating a filter therein.

With the shaft 46 and valve 50 in place within the housing, the displacement compressor comprises a long displacement air compressor chamber 48 of annular cross section bounded by the inside walls of valve 50, the outside of shaft 46 and the imperforate hub webs 52 and 54; together with a pair of gas and air bypass chambers 60 and 74 located respectively at opposite ends of the compressor housing, each of said bypass chambers being permanently connected to the outside atmosphere.

The engine 20 is equipped with the usual air and fuel valves and exhaust valves for each cylinder intake and exhaust port. The engine intake and exhaust valves are all actuated from the engine through a cam shaft 100 which operates at half the speed of the engine crank shaft. The drive shaft 46 for the valve 50 in the compressor is driven at one and one half times the speed of the six cylinder engine through suitable drive mechanism, such as the shaft and gear drives 102, 103 and 104 (Fig. I).

To allow for operation of engine 20 without operating compressor 50 as a supercharger, two rotary disc valves 106, 107 are mounted at the air transfer end of the housing 28 in position respectively to blank off communication between the interior of the compression chamber 48 and the atmospheric air chamber 74 by way of the respective intake horns 36 and 42. Valves 106 and 107 may be operated by a gear train 105 (Fig. IV) and are shown as rotatably mounted on center shafts 108, so that 180° rotation of the discs will move the ports 109 out of register with the housing ports 38 and 44 and into continuous register with air bypass chamber 74 to permit continuous supply of air from air cleaner 92 to both intake manifolds 34 and 40.

Carbureters 35 and 41 may be the usual type of float control carbureters which supply fuel from a constant level float chamber to a fuel admission nozzle mounted in the path of air flowing toward the intake air manifold. These carbureters may be provided with pressure balancing mechanism such as described in my aforementioned copending application whereby to adjust the operation of the carburetor to insure proper functioning both with and without supercharging.

The valve drive shaft 46 for the compressor is shown as journaled at opposite ends of the compressor on ball bearings 110—111. Ball bearing 111 at the hot gas transfer end of the compressor has been illustrated as protected and cooled by a water jacket 112. To seal the bearing 111 against contact with hot gases entering bypass chamber 60 of the compressor, a partition stuffing box 114 is mounted on the shaft 46 between chamber 60 and the bearing.

When operating engine 20 with supercharging, the air supply end of the compressor with its rotary valve ports 70, 72, must operate to: (a) transfer air at atmospheric pressure, or at the pressure obtaining in the air cleaner, through chamber 74 and through one of the intake manifolds to the intake port of a cylinder which is to be operatively connected to the compressor during a major part of the cylinder intake period; (b) cut off the atmospheric air supply and transfer compressed air from the compressor chamber 48 as a puff supercharging wave through the carbureter and intake manifold into the intaking cylinder at the end of the intaking period; (c) simultaneously with at least part of the atmospheric air transfer period "(a)", admit scavenging air at atmospheric pressure or at the pressure obtaining in the air cleaner 96, through ports 80, 78 and 82 into the compressor chamber 48.

Likewise the hot exhaust gas transfer end of the compressor, together with the valve wall ports disposed therein, must function to: (d) introduce the first or "puff" exhaust gas discharge from an engine cylinder which is operatively connected to the compressor into the chamber 48 during the supercharging period "(b)"; (e) cut off transfer of exhaust gas to chamber 48 and switch the exhaust gas discharged during the second or stroke portion of the engine exhaust into the aspirator pressure nozzle 84; (f) simultaneously with actions "(c)" and "(e)," open the connection between chamber 48 and exhaust expansion chambers 68, 88 and throat 86 for the purpose of scavenging the supercharger before beginning a new cycle. When operating the engine normally without supercharging, the air supply end of the compressor and valves 106, 107, should also function to: (g) interrupt discharge of compressed air from the compressor, and transfer atmospheric air to the engine intaking cylinders connected therewith throughout the entire intake period.

In Fig. VIII, the compressor port openings are plotted as to area and time (degrees valve angle and degrees crank angle). A complete supercharger cycle has a length of 120° crank angle or 180° valve angle. Thus, if the supercharger cycle begins at a point 30° crank angle before bottom dead center, the cycle finishes 90° later at 60° crank angle after bottom dead center. The exhaust gas intake and air discharge ports of the compressor chamber 48 open at substantially the same time, preferably about 30° crank angle before bottom dead center. The various curves in the diagram analyse the port openings over two complete supercharger cycles, relative to two coordinated pairs of engine cylinders, as for example, cylinders 1 and 6 and cylinders 5 and 2; i. e., relative to the exhaust periods of cylinders 1 and 5 and to the compressed air intake periods of cylinders 6 and 2.

In the drawings the single rotary compressor valve 50 is shown with the puff exhaust intake port 56 in a position of maximum port opening during the puff exhaust discharge period of engine cylinder 1. The puff exhaust gas discharge wave which enters the compressor chamber 48 compresses the air charge within the compressor and interconnected spaces until the total mass of air and gas has reached a balancing pressure. During the complete period of approximately 90° valve angle in which port 56 communicably connects exhaust manifold 24 with the pump chamber 48, the puff exhaust gas discharged from cylinder 1 rams a final charge of compressed air into intaking cylinder 6 by way of valve port 70 and carbureter 41 over a period of 45° plus 45° equal 90° valve angle. During the period thus illustrated in which cylinder 6 is supercharged, the smaller port 64 in valve 50 is inoperative, since it is passing over an imperforate section of the compressor housing. Over this same period web 54 at the air discharge end of the compressor is in position to cut off supply of atmospheric air to the cylinder 6, while at the same time permitting introduction of atmospheric air from bypass chamber 74 through port 72, housing port 38 and intake manifold 34 into cylinder 2.

The supercharging of cylinder 6 takes place during the latter part of its intake stroke and during the first part of its compression stroke. When the piston in the air intaking cylinder 6 reaches a point in its travel about 45° crank angle beyond bottom dead center position on the compression stroke, its air intake valve closes. During this period of transfer of air from the compressor to the cylinder 6 substantially the entire original air charge of the compressor is discharged under substantially the peak pressure impressed thereon by the puff exhaust wave from exhausting cylinder 1 of the engine.

During this same period the wing extension 58 of the valve blocks the lower half of the housing port 26 and thereby prevents discharge of any exhaust gases from cylinder 1 and manifold 24 into bypass chamber 60. However, at this same time the lower half of housing port 32 is open, thereby allowing stroke exhaust gases from cylinder 4 to discharge through bypass chamber 60 and ejector nozzle 84. As valve 50 continues to rotate in a clockwise direction, port 56 therein passes out of register with the upper half of housing port 26 at or shortly after the peak of the puff pressure wave from cylinder 1 has been reached, and as soon as communication is thus cut off between manifold 24 and the interior of the compressor, valve ports 56 and 64 move into register with housing ports 66 leading to the expansion chamber 68. At approximately the time that the gas discharge ports of the compressor are thus opened, the intake valve of cylinder 6 closes, although the interior of the compressor is still communicably connected with the intake manifold 40, thus permitting re-expansion of gas from the intake manifold into the compressor during the first part of the period of discharge of gas from the compressor to atmosphere through the expansion chambers 68 and 88 and the exhaust funnel 86. Likewise, as soon as communication is cut off between the interior of the compressor and the exhaust manifold 24, part 58 of the valve moves out of its illustrated blocking position with respect to manifold 24 to thereby open manifold 24 to permit transfer of stroke exhaust gases from cylinder 1 through manifold 24 and bypass chamber 60 and thence to atmosphere through ejector nozzle 84. Over a period of approximately 90° valve angle the lower halves of ports 32 and 26 are both open to permit discharge of stroke exhaust gases through ejector 84 from both cylinders 4 and 1.

By providing for continuous discharge of stroke exhaust gases through the ejector 84 it is possible to maintain a state of continuous partial vacuum in bypass chamber 60 and to thereby effect complete re-expansion and scavenging of the compressor chamber within a period corresponding to about 90° valve angle. About half way through this period of re-expansion and scavenging, the pressure within the compressor chamber 48 will have been reduced to substantially atmospheric, and at this time the ports 82 in the valve 50 come into register with air scavenging ports 78 over a relatively large area to admit scavenging air into the pump spaces. The air scavenging ports remain open for only a short period, approximately 45° valve angle, at which time the compressor has been filled with a fresh charge of air and is ready for a new cycle.

Curves 11 in the chart of Fig. VIII plot the length of the periods of opening of the puff exhaust intake port 56 of the compressor, and curves 12 plot the lengths of the openings of the compressed air discharge ports of the compressor. Curves 13 at the top of the chart plot the lengths of the gas exhaust periods of the compressor cycle which extend over a period of approximately 90° valve angle, while the air discharge ports (curve 12) stay open over a period of almost 140° valve angle, thus allowing for re-expansion within the compressor over a period of 140° minus 90° equals substantially 50° valve angle. Curves 14 (Fig. VIII) plot the area and length of opening of the ports 26, 32 of the compressor by means of which stroke exhaust gases are transferred directly from the respective exhaust manifolds to the ejector nozzle 84. It will be noted that the stroke exhaust from cylinder 4 continues throughout the entire period of the cycle of the compressor during which it is operatively connected between cylinder 1 and cylinder 6; and that the stroke exhaust from cylinder 1 commences at the instant that communication is cut off between cylinder 1 and the interior of the compressor, and continues throughout the balance of the first pump cycle and on through to the end of the next pump cycle.

The end of the re-expansion and scavenging period marks the end of the compressor cycle, and places the compressor in readiness for operation on a second cycle during which the exhausting cylinder is cylinder 5, and the cylinder taking in supercharge air is cylinder 2. By that time cylinder 2 has sucked in air from atmosphere over an interval of 180° valve angle (dotted curves 16) while the compressor was going through a complete cycle supercharging the cylinder preceding it in firing order and while the compressor was being scavenged. Curves 15 of Fig. VIII plot the lengths of the scavenging air port openings 82, 78 and 80.

As previously indicated, the manifold arrangement portrayed in Figs. I—VII and X is for a six-cylinder engine in which the cylinders have the firing order 1—5—3—6—2—4. For an engine having the firing order 1—2—4—6—5—3, the manifolds would have to be rearranged so that cylinders 1, 4 and 5 would have a common exhaust manifold and a common intake manifold, and another pair of intake and exhaust manifolds would serve cylinders 2, 3 and 6. The manifold arrangement which is portrayed in Fig. IX for an asesmbly of compressor and four-cylinder engine, is equally adapted for an engine in which the firing order is 1—3—4—2 and for one in which the firing order is 1—2—4—3.

In Fig. IX the four-cylinder, four-stroke cycle engine 21 is shown diagrammatically as operatively connected to a gas displacement air compressor 23 for the purpose of supercharging the engine by means of energy derived from the engine exhaust gases. The four cylinders of engine 21 have been shown as mounted in two engine blocks. The intake ports of cylinders 1 and 4 are connected by an intake manifold 33 to a compressed air discharge port 37 at the air discharge end of compressor 23; and the intake ports of cylinders 2 and 3 are connected by an intake manifold 39 to a compressed air discharge port 45 opposite port 37. Displacement gas inlet ports at the other end of the compressor 23 may be connected to the discharge ports of cylinders 1 and 4 and cylinders 2 and 3, respectively, by engine exhaust manifolds disposed in the same relative positions occupied by the intake manifolds 33 and 39. Also the housing ports and valve ports of compressor 23 may be disposed in the same positions as the corresponding ports of compressor 22 of Figs. I to VII, providing that the valve unit of compressor 23 is rotated at engine speed.

In Fig. 1 exhaust manifold 24 has been shown as incorporating an expansion sleeve joint in order to allow for relative heat expansion between the left and right halves of the manifold casting. In the case of small engines, no expansion joint may be necessary, but for large engines it may be desirable to provide two such joints, including one for the left hand manifold casting 30.

Air scavenging of the compressor may be effected without the use of an aspirator for developing suction at the compressor gas discharge ports, and without supplying scavenging air at atmospheric pressure. Also the air for scavenging the compressor may be derived from the same source of air supply which delivers air to the engine intake manifolds during periods when they are not operatively connected to the compressor. Because of the very short time period allowable for scavenging a compressor which is operatively connected with a six cylinder engine, an assembly such as that portrayed in Fig. I is preferred, to insure port openings of extensive area for admission of scavenging air during the scavenging period of the compressor cycle, and to provide expansion chambers of substantial capacity and preferably under the continuous suction effect of an aspirator, with which the gas exhaust ports of the compressor directly communicate during the re-expansion and scavenging periods of the compressor cycle. To insure proper scavenging in the event that suction effects at the gas discharge end of the supercharger are not sufficient, air may be supplied to the air intake ports of the compressor under the positive pressure furnished by a fan or blower 116 (Fig. IV). Also, particularly in the case of assemblies of a gas displacement compressor and a multi-cylinder Diesel engine, it may be desirable to supply air through filter 90 and bypass chamber 74 to the intake manifolds of the engine under the positive pressure furnished by a fan or blower 118 (Fig. IV) for the purpose of insuring proper scavenging of the engine cylinders and cooling of the piston heads.

As indicated above, the invention is not limited to the specific apparatus which has been described. Among other modifications, the invention contemplates a compressor in which the casing or housing may be rotatable and the tubular valve stationary, and in which other means may be substituted for those specifically described whereby to vary the timing and/or area of the gas and air transfer port openings.

Having thus described the invention, what is claimed as new is:

1. In a gas displacement air compressor, an elongated tubular housing, a pair of peripherally spaced wall ports for the introduction of displacing gas located adjacent one end of said housing, at least one wall port for the discharge of gas located adjacent the same end of the housing, individual air inlet and discharge ports located at spaced points in the wall of said housing adjacent its other end, a valve unit mounted coaxially within said housing for relative rotation with respect thereto and having tubular side walls positioned and dimensioned to form a close journal fit with the ported sections of the housing, wall ports in the valve unit rotatably aligned respectively with the housing gas inlet and gas discharge ports and with the housing air inlet and discharge ports, said valve ports being so disposed relative to each other and to the housing ports that while one valve port registers with a housing air discharge port another is in register with a housing gas inlet port, and that housing air inlet and gas discharge ports are connected by coregistering valve ports at a period in the compressor cycle when the gas inlet and air discharge ports of the housing are blanked off by the valve.

2. A gas displacement compressor as defined in claim 1 together with a pair of displacing gas supply manifolds each respectively connected to one of the housing gas inlet ports, a gas expansion chamber communicably connected to the housing gas discharge ports, an aspirator mounted in position for maintaining said expansion chamber under subatmospheric pressure, a gas bypass chamber having an outlet port connected to said aspirator and having spaced inlets respectively connected to each of said displacing gas supply manifolds, and an extension of said valve unit arranged to periodically block communication between the bypass chamber and one manifold while permitting communication between the bypass chamber and the other manifold.

3. A gas displacement air compressor as defined in claim 1 in which the housing air discharge ports and the housing gas inlet ports are so positioned and dimensioned relative to each other and to valve ports rotatably aligned therewith that a valve port remains in register with one housing air discharge port for a period of expansion after another valve port has rotated out of register with a housing gas inlet port.

4. A gas displacement air compressor as defined in claim 1 in which the housing air inlet ports and the housing air discharge ports are so positioned and dimensioned relative to each other and to valve ports rotatably aligned therewith that a valve port is in register with a housing air inlet port for a scavenging period after another valve port has rotated out of register with said housing air discharge port.

5. A gas displacement air compressor as defined in claim 1, together with a gas expansion chamber communicably connected to the housing gas discharge ports, and means operatively connected with said gas expansion chamber for continuously maintaining a partial vacuum therein.

6. A gas displacement air compressor as defined in claim 1, together with a pair of displacing gas supply manifolds each communicably connected with one of the housing gas inlet ports, a gas expansion chamber communicably connected to the housing gas discharge ports, an outlet for said expansion chamber, and an aspirating nozzle mounted in said outlet and having valve controlled connections with each of said manifolds.

7. A gas displacement compressor as defined in claim 1 together with air and gas bypass chambers respectively located at opposite ends of the housing between the housing end and the adjacent end of the valve, an air inlet port and two peripherally spaced air discharge ports in the walls of the air bypass chamber, two peripherally spaced gas inlet ports and a gas outlet port in the walls of the gas bypass chamber, and extensions of the valve at each end thereof rotatably aligned respectively with the air discharge ports in the air bypass chamber and with the gas inlet ports in the gas bypass chamber.

8. In a gas displacement air compressor two coaxially disposed elongated tubes, one larger and longer tube being dimensioned to form a housing in which the smaller tube is rotatably journaled as a valve, imperforate transverse disc closures adjacent each end of the valve forming end walls for a displacement chamber therebetween, a wall port in the valve at one end of said chamber, a second wall port in the valve at the other end of said chamber, a third valve wall port at a midsection of said chamber, a pair of oppositely disposed pressure gas transfer ports in said housing rotatably aligned with said first valve port, a second pair of oppositely disposed gas discharge ports in said housing positioned at substantially right angles to said first pair of housing ports and rotatably aligned with said first valve port, a third pair of oppositely disposed air transfer ports in said housing rotatably aligned with said second valve port, and a fourth pair of oppositely disposed air inlet ports in said housing rotatably aligned with said third valve port.

9. A displacement compressor as defined in claim 8 in which the housing ports and valve ports are disposed and dimensioned relative to each other so that at one position of the valve a housing gas transfer port is communicably connected through the displacement chamber with a housing air transfer port while the other housing ports are blanked off, and at another position of the valve only the housing air inlet ports and the housing gas discharge ports are communicably connected.

10. A displacement compressor as defined in claim 8 together with a gas bypass chamber at one end of the housing just outside the gas transfer end of the displacement chamber, a fourth valve port located in the displacement chamber wall opposite the first valve port and rotatably aligned with the first and second pairs of housing ports, extensions of each of the ports of the first pair of housing gas transfer ports in opposite walls of said gas bypass chamber, and a cylinder segment of the valve wall extending into said bypass chamber and rotatably aligned with said gas transfer port extensions, said valve segment being dimensioned so as to block one transfer port extension while the other is open to the bypass chamber, the adjacent end wall of the displacement chamber being disposed obliquely to form with the valve segment a full partition between the housing gas transfer ports.

11. A gas displacement air compressor as defined in claim 8 together with end wall closures at each end of the housing, each housing end being longitudinally spaced from the adjacent end of the displacement chamber, an air bypass chamber in the space thus provided just outside the air transfer end of the displacement chamber, an additional valve port located opposite the second valve port and rotatably aligned with the third pair of housing ports, the adjacent end wall of the displacement chamber being disposed obliquely to form a partition between the said additional valve port and the second valve port and said ports being arranged so that the additional valve port communicably connects said air bypass chamber with one air transfer port of the housing whenever the second valve port registers with the other housing port of the third pair.

12. A gas displacement compressor as defined in claim 8 together with a fourth valve port directly opposite the first valve port, and a fifth valve port directly opposite the third valve port.

13. A displacement compressor as defined in claim 8 together with a tubular sleeve bushing mounted coaxially within the housing and extending throughout that intermediate section thereof in which the air inlet ports are located, and apertures in the bushing adapted to register with the air inlet ports in the housing.

14. In an energy conversion operation wherein cylinders of a multi-cylinder four cycle internal combustion engine operate on power strokes following each other in sequence with a crank angle spacing of 120°–180°, the steps comprising, introducing air from atmosphere into each cylinder during the first part of its intake period, supercharging compressed air into each cylinder during the last part of its intake period, simultaneously with the commencement of the supercharging operation in one cylinder commence discharge of exhaust combustion gases from another paired cylinder operating substantially 360° crank angle apart in phase, just prior to the commencement of each cylinder gas exhaust period trapping a body of air in an elongated chamber, during the first part of each cylinder gas exhaust period transferring a rapidly advancing puff wave of hot exhaust gases discharged under pressure from said cylinder into one end of said chamber, thereby displacing and compressing air therein by a pressure balancing operation, transferring the compressed air from the other end of the chamber ahead of the advancing gas wave directly into the cylinder taking in air during the supercharging period therein, and discharging exhaust gases from the chamber and trapping a fresh supply of air therein in the period remaining before another pair of cylinders begin their supercharging and gas exhaust periods, respectively.

15. In energy conversion apparatus, a multi-cylinder four stroke cycle internal combustion engine, a valved gas exhaust port for each cylinder, a pair of engine exhaust manifolds each communicably connected with the exhaust ports of cylinders the pistons in which reciprocate in sequence with a crank angle spacing of 240°–360°, a gas displacement air compressor comprising an elongated tubular housing, a pair of peripherally spaced wall ports at one end of the housing each communicably connected to an exhaust manifold, a gas discharge port at the same end of the housing, an air discharge port and an air intake port each located adjacent the other end of the housing, a valve unit mounted coaxially within said housing for relative rotation with respect thereto and having tubular side walls positioned and dimensioned to form a close journal fit within the housing, said valve having wall ports rotatably aligned with the respective housing ports and arranged so that at one portion of a compressor cycle a valve port registers with the housing air discharge port while another valve port is in register with one of the housing gas transfer ports and later in the cycle the housing air intake and gas discharge ports are connected while communication between the housing gas transfer and air discharge ports is blocked.

16. In energy conversion apparatus, a multi-cylinder four stroke internal combustion engine, a valved gas exhaust port and a valved air intake port for each cylinder, a pair of engine exhaust manifolds each communicably connected with the exhaust ports of cylinders the pistons in which reciprocate in sequence with a crank angle spacing of 240°-360°, a pair of intake manifolds each communicably connected with the intake ports of cylinders the pistons in which reciprocate in sequence with a crank angle spacing of substantially 360° with respect to pistons in cylinders connected to one of the exhaust manifolds, a gas displacement air compressor comprising an elongated tubular housing, a valve unit mounted coaxially within said housing for relative rotation with respect thereto and having tubular side walls positioned and dimensioned to form a close journal fit within the housing, a pair of peripherally spaced wall ports at one end of the housing each communicably connected to an exhaust manifold, a pair of peripherally spaced wall ports at the other end of the housing each communicably connected to an intake manifold, an air intake port adjacent the last-named end of the housing and a gas discharge port at the other end of the housing, and wall ports for said valve rotatably aligned with each of said housing ports and arranged to simultaneously connect a cylinder exhaust port through the compressor with the intake port of a cylinder operating with a crank angle spacing of 360° and subsequently to interrupt such connection and communicably connect the housing air intake and gas discharge ports during the last part of the compressor cycle.

17. Energy conversion apparatus as defined in claim 16 together with a gas expansion chamber communicably connected to the housing gas discharge port and having an outlet port, a gas ejector nozzle mounted in the outlet of said expansion chamber in position to develop a partial vacuum therein, a gas bypass chamber communicably connected respectively with said nozzle and with each of said engine exhaust manifolds, and an extension of said valve unit arranged to periodically block communication between said bypass chamber and one of the exhaust manifolds during a period in which said exhaust manifold is communicably connected with the compressor.

18. Energy conversion apparatus as defined in claim 16 together with an air supply chamber having a pair of ports respectively communicating with each of the engine intake manifolds, and an extension of said valve unit arranged to block communication between said air supply chamber and one of said intake manifolds during a period in which said intake manifold is communicably connected to the air discharge end of the compressor.

19. Energy conversion apparatus as defined in claim 16 together with an air supply chamber having a pair of ports respectively communicating with each of the engine intake manifolds, an extension of said valve unit arranged to block communication between said air supply chamber and one of said intake manifolds during a period in which said intake manifold is communicably connected to the air discharge end of the compressor, and means for delivering air under pressure to said air supply chamber and to the compressor housing air intake port.

20. In an energy conversion operation wherein cylinders of a multi-cylinder internal combustion engine operate on power strokes following each other in regular sequence with a crank angle spacing of 120°-180°, the steps comprising, introducing air at low pressure into each cylinder during the first part of its air intake period while simultaneously trapping a body of air at said low pressure in a wall enclosed chamber, during the last part of the air intake period of each cylinder introducing a rapidly advancing puff wave of hot gaseous products of combustion discharged under high pressure from another cylinder commencing its waste gas discharge period into one end of said chamber thereby compressing said air by pressure balancing displacement and transferring the compressed air body from the other end of the chamber ahead of the advancing gas wave as supercharge air directly into the cylinder taking in air while filling said chamber with the hot gas, and discharging exhaust gases from the chamber and trapping a fresh supply of air therein in the period remaining before another pair of cylinders begin their supercharging and gas exhaust periods, respectively.

JOHANN J. WYDLER.